(12) United States Patent
Bethge

(10) Patent No.: US 7,112,262 B2
(45) Date of Patent: Sep. 26, 2006

(54) DEVICE FOR DOWNWARD FLOW EVAPORATION OF A LIQUID SUBSTANCE AND SUBSEQUENT CONDENSATION OF THE VAPOUR FORMED

(75) Inventor: Daniel Bethge, Ettlingen (DE)

(73) Assignee: GEA Wiegand GmbH, Ettlingen (DE)

( * ) Notice: Subject to any disclaimer, the term of this patent is extended or adjusted under 35 U.S.C. 154(b) by 0 days.

(21) Appl. No.: 10/490,839

(22) PCT Filed: Sep. 9, 2002

(86) PCT No.: PCT/EP02/10086

§ 371 (c)(1),
(2), (4) Date: Mar. 25, 2004

(87) PCT Pub. No.: WO03/028843

PCT Pub. Date: Apr. 10, 2003

(65) Prior Publication Data

US 2004/0245084 A1    Dec. 9, 2004

(30) Foreign Application Priority Data

Sep. 27, 2001 (DE) .............................. 101 47 674

(51) Int. Cl.
*B01D 1/22* (2006.01)
*B01D 3/10* (2006.01)
*B01D 3/28* (2006.01)

(52) U.S. Cl. .................... 202/172; 159/13.2; 159/27.3; 159/27.4; 159/43.1; 159/DIG. 16; 202/186; 202/205; 202/236

(58) Field of Classification Search ............... 202/172, 202/205, 186, 236; 159/43.1, 27.3, 27.4, 159/13.2, DIG. 16; 203/87, 72, 73
See application file for complete search history.

(56) References Cited

U.S. PATENT DOCUMENTS

| | | | | |
|---|---|---|---|---|
| 1,958,547 A | * | 5/1934 | Payne et al. ............... | 196/128 |
| 2,159,303 A | * | 5/1939 | Waterman et al. ........... | 159/18 |
| 2,349,657 A | * | 5/1944 | Hermelin et al. .......... | 159/13.3 |

(Continued)

FOREIGN PATENT DOCUMENTS

CH    510450    12/1968

(Continued)

OTHER PUBLICATIONS

Copy of Search Report for application No. DE 101 47 674.4 Dated Jun. 12, 2002.

*Primary Examiner*—Virginia Manoharan
(74) *Attorney, Agent, or Firm*—Scott D. Wofsy; Edwards Angell Palmer & Dodge LLP

(57) ABSTRACT

A device is disclosed for downward flow evaporation of a liquid substance and subsequent condensation of the vapor formed, which includes a plurality of vertical evaporator tubes housed in a common casing in side-by-side relationship, a distributor tank which is arranged above the evaporator tubes and from which the substance contained therein can be fed to the evaporator tubes with production of a film of the substance running down the tube surface of the evaporator tubes, a heat exchanger arrangement arranged in the casing and having a plurality of vertical condensation tubes having a surface upon which the vapor can be condensed, receiving trays housed below the evaporator tubes and below the condensation tubes in the casing to separately receive unevaporated concentrate of the substance which runs down the tube surface of the evaporator tubes or condensed distillate of the substance which runs down the tube surface of the condensation tubes.

17 Claims, 2 Drawing Sheets

| U.S. PATENT DOCUMENTS | | | | FOREIGN PATENT DOCUMENTS | | |
|---|---|---|---|---|---|---|
| 3,233,656 A | | 2/1966 | Rodenacker | DE | 529 063 | 7/1931 |
| 4,282,058 A | | 8/1981 | Grueter | DE | 1519714 | 2/1970 |
| 4,504,361 A | * | 3/1985 | Tkac et al. .................. 202/172 | DE | 3223314 | 1/1983 |
| 4,517,057 A | * | 5/1985 | Fauser et al. ................ 202/205 | EP | 0066790 | 12/1982 |
| 5,423,952 A | * | 6/1995 | Stout .......................... 202/174 | EP | 0186291 | 7/1986 |
| 5,624,531 A | * | 4/1997 | Knuutila et al. ............ 159/13.3 | | | |
| 6,089,312 A | * | 7/2000 | Biar et al. ................... 165/118 | * cited by examiner | | |

DEVICE FOR DOWNWARD FLOW EVAPORATION OF A LIQUID SUBSTANCE AND SUBSEQUENT CONDENSATION OF THE VAPOUR FORMED

The invention relates to the downward flow evaporation of a liquid substance and subsequent condensation of the vapor formed.

Downflow evaporators (also referred to as falling-film evaporators) are used, for example, in the chemical industry for evaporating down aqueous solutions or for concentrating various organic or inorganic substances, for example caprolactam or glycerol. Usually, the liquid to be treated is allowed to run from above out of a tank onto the inner surface of one or more heated evaporator tubes, where it runs down as a film. The downward running liquid partly evaporates and is converted into a vapor. The unevaporated components of the liquid are received below the evaporator tube and collected. Liquid mixtures can thus be separated by evaporating individual components, or a liquid substance can be concentrated by evaporating readily volatile components.

In contrast to thin-film evaporators, having rotating distributor disks and a roller wiper basket, the downflow evaporator design which is simple because it manages without moving parts and without a wiping system makes it possible economically to construct evaporators which are capable of processing large throughput quantities of, for example, several tons per hour. However, the possibilities for the use of downflow evaporators to date are subject to limits owing to the minimum pressure which can be reached in the evaporation space. The lower this pressure, the lower the boiling point of the components to be evaporated. However, the lower the boiling point, the more easily and gently can the various components of a substance be separated, the less heat energy need be applied for heating the evaporator tubes and accordingly the more economically can the evaporator systems be operated.

In the case of downflow evaporators to date, the resulting vapor is regularly sucked out of the evaporator and liquefied again in an external condenser, usually by means of a heat exchanger. The vapor is passed via a pipeline from the downflow evaporator to the condenser. Along its path in the evaporator tube and through the pipeline, the vapor flow experiences a pressure drop; in the case of the usual dimensions of the pipeline, this can easily be a few mbar. In the evaporation space, it is then possible only to reach a minimum pressure which corresponds to the pressure prevailing in the condensation space plus the pressure drop in the pipeline. Even in the case of a strong vacuum in the condensation space of, for example, 0.1 mbar, accordingly no vacuum of less than a few mbar can be generated in the evaporation space.

In process engineering, products which are to be evaporated down, concentrated or distilled economically under high vacuum in large amounts are occasionally encountered. In view of the desired high vacuum, however, it has to date not been possible to employ downflow evaporators for this purpose, although, owing to their comparatively low capital costs, these would be more suitable than other, technically more complicated solutions.

Swiss Patent 510 450 or German Patent DE-A 1 519 714 discloses downflow evaporators in which a heat exchanger consisting of a bundle of condensation tubes is arranged inside a vertical evaporator tube. Although in these downflow evaporators the distance between the evaporator surface formed by the inner surface of the evaporator tube and the condensation surfaces of the condensation tubes is relatively small, a louvered tube provided with passages encloses the condensation tube bundle between the bundle and the inner surface of the evaporator tube. The louvered tube extends over the total axial height of the evaporator tube and, in the case of gas-evolving substances, is intended to prevent concentrate splashes from reaching the condensation tubes. However, it has been found that the louvered tube leads to an undesired pressure drop so that it is not possible to work under the desired high vacuum conditions in the evaporation space even in the case of the known downflow evaporators having an internal condensation tube bundle.

It is therefore an object of the invention to develop a downflow evaporator in a constructively simple manner so that liquid substances can be processed even at a higher vacuum than in the past.

In achieving this object, the invention starts from a device for downward flow evaporation of a liquid substance and subsequent condensation of the vapor formed, comprising
at least one vertical evaporator tube housed in a casing,
a distributor tank which is arranged above the evaporator tube and from which the substance contained therein can be fed to the evaporator tube with production of a film of the substance which runs down the tube surface of said evaporator tube,
a heat exchanger arrangement arranged in the casing and having at least one vertical condensation tube, on the tube surface of which the vapor can be condensed,
receiving means which are housed below the evaporator tube and below the condensation tube in the casing and which separately receive unevaporated concentrate of the substance which runs down the tube surface of the evaporator tube or condensed distillate of the substance which runs down the tube surface of the condensation tube.

According to the invention, it is intended that the evaporator tube and the condensation tube be arranged coaxially one inside the other in pairs, the evaporator surface formed by the tube surface of the evaporator tube and the condensation surface formed by the tube surface of the condensation tube being coaxially opposite one another and free of obstacles. In the device according to the invention, the condensation surface and the evaporator surface are directly opposite one another at a comparatively small radial distance, without internals leading to pressure drops, such as, for example, a louvered tube. The spacing of the tube surfaces is of the order of magnitude of centimeters, for example from 0.5 to 15 cm, and, at the high vacuum established during operation between the evaporator tube and the condensation tube, is therefore of the order of magnitude of the free path for the molecules passing over from the evaporator surface to the condensation surface. The downflow evaporator according to the invention can therefore be operated under high vacuum at high condensation yield. Where there is a danger of splashes passing from the evaporator tube to the condensation tube in the case of gas-evolving substances, this can be avoided in a manner known per se by suitable evaporator temperatures.

The distillate deposited on the outer surface of the condensation tube is received by the receiving means separately from the unevaporated components of the liquid, referred to here as concentrate. The term concentrate is intended merely to represent these unevaporated components even if, in some applications of the device according to the invention, concentration of a substance is not the primary aim but, for example, separation of a mixture, for example of a water/oil emulsion, or distillation. The device according to the invention is therefore suitable for distilling, concentrating or separating components of the substance.

In order to increase the capacity of the device according to the invention, a plurality of evaporator tube/condensation tube pairs can be housed side by side in the casing.

A preferred development of the invention envisages that the receiving means comprise two receiving trays which are arranged one above the other and the upper one of which receives the concentrate and the lower one of which receives the distillate. To enable the distillate to pass through the upper receiving tray to the lower receiving tray, the upper of the two receiving trays has a passage which is coordinated with each condensation tube and through which the distillate deposited on the relevant condensation tube passes onto the lower receiving tray.

Preferably, each condensation tube is even led through the coordinated passage at a distance from its opening edge all around. In this way, the distillate need not drip under gravity through the passage(s) of the upper receiving tray onto the lower receiving tray but runs along the condensation tube through the passage. Undesired distillate splashes on the upper collecting tray can thus be effectively avoided.

Expediently, each passage is bordered by an upward-projecting annular collar. This passes the concentrate received by the upper receiving tray around the passage(s).

In the preferred embodiment explained above, the inner surface of the outer tube of each pair of tubes forms the evaporator surface, while the outer surface of the inner tube forms the condensation surface. Of course, in an alternative embodiment, the evaporator surface may also be formed by the inner tube while the outer tube forms the condensation surface. In this way, the area of the inner surface of the outer tube, which area is greater compared with the outer surface of the inner tube, can be utilized for increasing the condensation performance, which is desirable for many applications.

In both variants, the receiving trays are preferably formed by substantially flat receiving plates installed obliquely, in particular obliquely in opposite directions, relative to the horizontal in the casing. Of course, arched embodiments of the receiving trays are also conceivable.

It may be advantageous if at least one of the receiving trays, in particular at least the concentrate receiving tray, is heatable. In the case of some products to be treated, the unevaporated concentrate may in fact be so highly viscous that it flows away only with difficulty. By heating the relevant receiving tray, the concentrate can then be kept at a sufficiently low viscosity to remove it without problems from the casing.

A simple but effective method of heating can comprise making the heatable receiving tray double-walled with a cavity between its two walls and connecting the cavity to a circulation for a heating medium.

A connection for an evacuating pipe connected to pumping means, via which the working space between evaporator tube and condensation tube can be evacuated, may be mounted on the casing between the two receiving trays. The evacuating pipe preferably opens above the distillation collecting tray, so that only the uncondensable components are sucked off. The pumping means are advantageously designed for generating a reduced pressure of less than 10 mbar, preferably less than 5 mbar and most preferably less than 1 mbar in the working space.

Regarding its retention, the inner tube of each pair of tubes can be supported on the distributor tank.

In order to feed the substance to the at least one evaporator tube enclosing the condensation tube, the distributor tank can, in a first variant, be in the form of a perforated tank whose tank bottom has, coordinated with each evaporator tube, an arrangement of flow-through holes distributed in a circular manner and intended for the substance contained in the distributor tank. In this variant, the liquid at the bottom of the distributor tank flows away through the flow-through holes and flows down to the respective evaporator tube.

Below, embodiments of the invention are explained in more detail with reference to the attached drawing.

Figure 1:
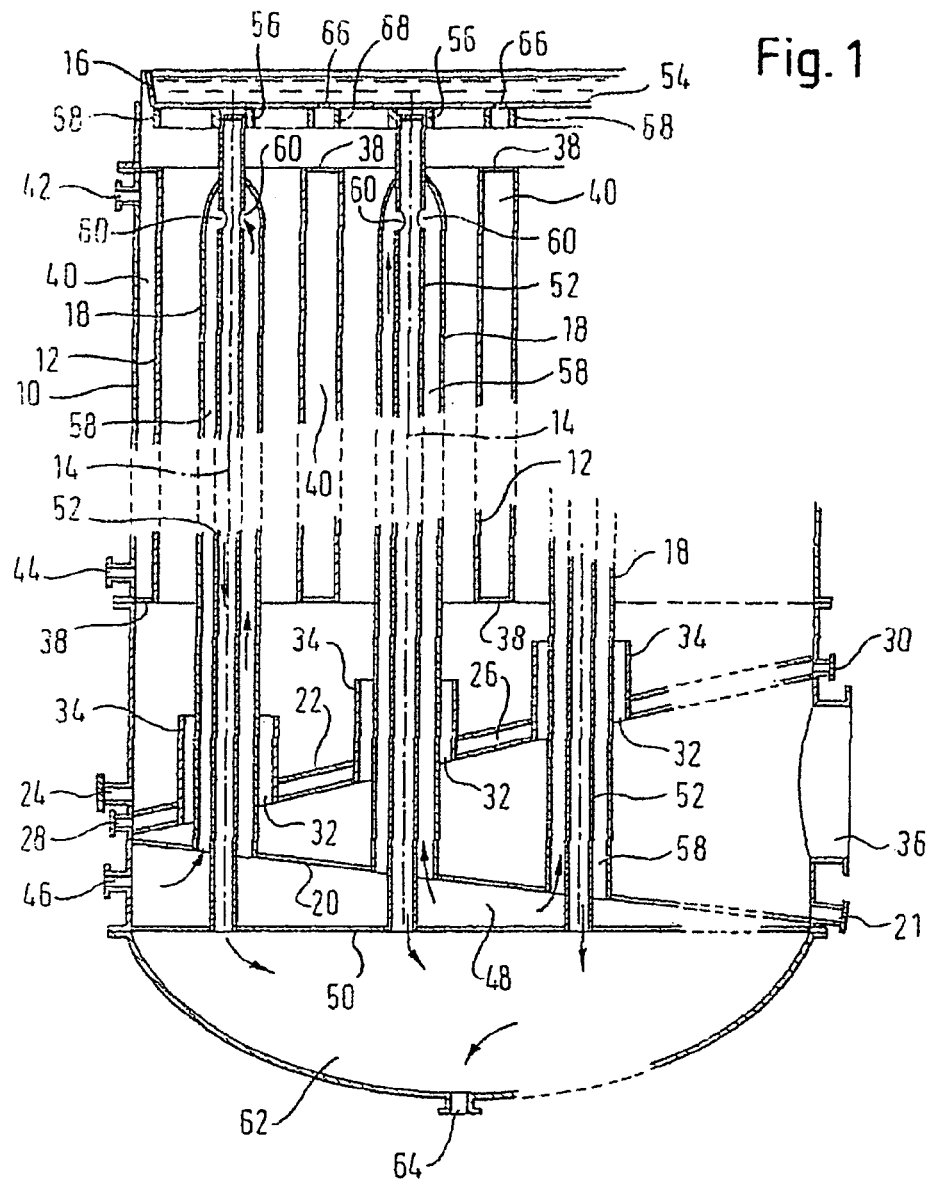
FIG. 1 shows a vertical section of a first embodiment of a downflow evaporator according to the invention, with internal condensation.
Figure 2:
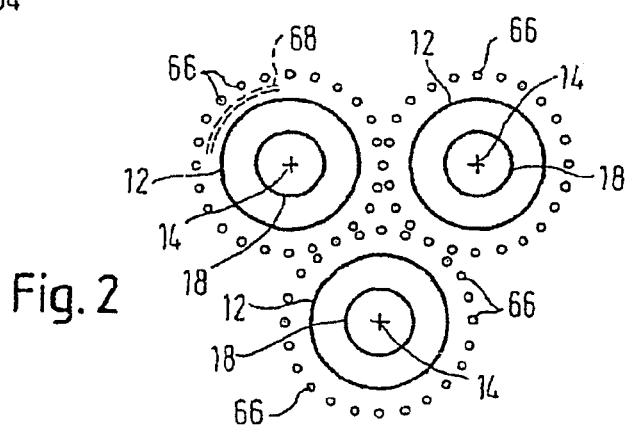
FIG. 2 shows a plan view from above of an arrangement for evaporator tubes and condensation tubes of the downflow evaporator of FIG. 1

The unit shown in FIGS. 1 and 2 and serving for evaporation and subsequent condensation of products, for example of the chemical or pharmaceutical industry, has a casing 10 which is cylindrical over the substantial part of its height and in which a plurality of downflow evaporator tubes 12, each having a vertical tube axis 14, is housed side by side. A distributor tank 16 from which the evaporator tubes 12 are fed with liquid to be evaporated is mounted on the casing 10, above the evaporator tubes 12. The liquid runs down as a film along the inner circumferential surface of each evaporator tube 12; while it is running down, it partly evaporates. In order to condense the resulting vapor at least partly, a condensation tube 18 is inserted into each evaporator tube 12, concentrically with its tube axis 14, the condensable components of the vapor being deposited on the outer circumferential surface of said condensation tube. Substantially in the total axial range in which the condensation tube 18 overlaps the evaporator tube 12, there are no internals hindering the passage of the vapor from the evaporator tube 12 to the condensation tube 18. The radial spacing of the tube surfaces opposite one another is in the centimeter range and is from 0.5 to 15 cm. The distance is therefore of the order of magnitude of the free molecular path. The precipitation on the condensation tube 18—referred to here as distillate—runs down the condensation tubes 18. At its bottom, the condensation tubes 18 are connected to a receiving plate 20 which is installed obliquely in the casing 10 and receives the distillate. The distillate runs in the gradient direction of the receiving plate 20 to its lowest point and collects there. The collected distillate can then be removed from the casing 10 via a casing connection 21.

Below the evaporator tubes 12, but above the receiving plate 20, a further receiving plate 22 is installed, likewise obliquely, in the casing 10. This receiving plate 22 serves for receiving the unevaporated components of the liquid running down the evaporator tubes 12, which components are referred to here as concentrate for short. The evaporator tubes 12 end a distance above the receiving plate 22, and the concentrate therefore falls under gravity from the bottom of the evaporator tubes 12 onto the receiving plate 22. The oblique installation position of the receiving plate 22 in turn results in the concentrate flowing in the gradient direction of the receiving plate 22 to its lowest point and collecting there. The collected concentrate can then be removed from the casing 10 via a casing connection 24.

In the case of some products to be evaporated, the concentrate may be comparatively viscous and may flow away only with difficulty on the receiving plate 22. The flowing away is facilitated if the viscosity of the concentrate is reduced. For this purpose, the receiving plate 22 is designed as a double-walled hollow plate whose plate cavity denoted by 26 can be connected via connecting pieces 28, 30 on the casing 10 to a heating circulation which is not shown. A heating fluid (for example vapor or heated oil) which is passed in at one of the connecting pieces 28, 30 and removed at the other connecting piece circulates in this heating circulation. For example, vapor is passed into the plate cavity 26 through the higher connecting piece 30, and the vapor condensate is removed from the lower connecting piece. In the case of oil as heating fluid, the method of connection is the opposite.

For each condensation tube 18, a passage 32 whose opening cross section is greater than the tube cross section of the condensation tubes 18 is formed in the upper receiving plate 22, so that said condensation tubes 18 can be led through the passages 32 with radial play all around to the lower receiving plate 20. A dividing tube 34 which projects upward beyond the receiving plate 22 and thus forms an annular collar which prevents the concentrate falling from the evaporator tubes 12 onto the receiving plate 22 from running into the relevant passage 32 is inserted into each of the passages 32. The dividing tubes 34 thus ensure clean separation of the distillate and of the concentrate. It is advisable to make the dividing tubes 34 sufficiently long so that they not only can guide the concentrate flowing away on the receiving plate 22 around the passages 32 but also can trap any splashes of the concentrate onto the condensation tubes 18.

FIG. 1 clearly shows that the two receiving plates 20, 22 are installed obliquely in opposite directions in the casing 10. Consequently, a large distance can be created between the receiving plates 20, 22 in a casing region without having to increase the total construction height of the unit. In the discussed region of a large distance between the receiving plates 20, 22, there is then sufficient space to mount an evacuating connection 36 on the casing 10, to which evacuating connection a suction pipe connected to a vacuum pump can be connected in a manner not shown. Via the evacuating connection 36, gases and the uncondensable components of the vapor are sucked out of the working space between the evaporator tubes 12 and the condensation tubes 18, through the spaces between the dividing tubes 34 and the condensation tubes 18. The large dimension of the evaporation surfaces and of the condensation surfaces and their small spacing give rise to only a negligible pressure drop of the vapor flow. This makes it possible to generate pressures below 1 mbar, for example of the order of magnitude of 0.1 mbar, in the working space. Evaporation at such low pressures was not achieved in the case of downflow evaporators to date.

At their base and at their top, the evaporator tubes 12 are held to one another and to the casing 10 by plate webs 38. A cavity 40 which surrounds each evaporator tube 12 all around and is part of a further heating circulation which is not shown is formed between the casing 10, the evaporator tubes 12 and the plate webs 38. A heating fluid serving for heating the evaporator tubes 12, for example hot vapor or a heat transfer oil, circulates in this heating circulation. Via an upper connecting piece 42 and a lower connecting piece 44 on the casing 10, the heating fluid is passed into the heating cavity 40 and removed therefrom. When vapor is used as a heating fluid, the upper connecting piece 42 is used as an inlet so that the condensate unavoidably forming can be discharged at the lower connecting piece 44. With the use of a heat transfer oil, the lower connecting piece 44 can be used as an inlet and the upper connecting piece 42 as an outlet.

It is conceivable and also preferable to divide the heating cavity 40 in the axial direction and to feed each of these spaces separately with a heating fluid. In this way, it is possible to establish a different heating temperature along the evaporator tubes 12.

For efficient condensation of the vapor, the condensation tubes 18 are cooled on the inside. For this purpose, the condensation tubes 18 are integrated into a cooling circulation which is not shown and in which a coolant circulates. The coolant passes via an inlet connection 46 on the casing 10 into a coolant distributor space 48 which is bounded at the top by the receiving plate 20 and at the bottom by an intermediate wall 50 drawn into the casing 10. Each of the condensation tubes 18 is double-walled and has for this purpose an inner tube 52, which extends at the bottom to the intermediate wall 50 and is supported there. At the top, the inner tubes 52 extend up to the vicinity of the bottom of the distributor tank 16, which bottom is denoted by 54. There, they are supported on retaining rings 56 which are mounted on the underside of the tank bottom 54.

An annular space 58 into which the coolant from the coolant distributor space 48 flows from below is formed in each condensation tube 18, around its inner tube 52. The coolant flows upward into the annular spaces 58 of the condensation tubes 18 until it reaches openings 60 which are incorporated into the inner tubes 52. There, it flows into the inner space of the inner tubes 52 and flows back downward. At the base of the inner tubes 52, it enters a collecting tank 62 located below the intermediate wall 50 and leaves the evaporator unit via an outlet 64. The path taken by the coolant inside the evaporator unit is illustrated in FIG. 1 by arrows.

In order to feed the liquid to be evaporated, which is contained in the distributor tank 16, to the evaporator tubes 12, the distributor tank 16 is in the form of a perforated tank, i.e. its tank bottom 54 is penetrated by a plurality of flow-through holes 66. As shown in particular in FIG. 2, the flow-through holes 66 are arranged distributed in a circular manner around each evaporator tube 12. This makes it possible to feed the liquid to the evaporator tubes 12, distributed uniformly around their tube circumference. The flow-through holes 66 are arranged over the plate webs 38, i.e. offset slightly radially outward relative to the inner circumferential surface of the evaporator tubes 12. The liquid flowing through the flow-through holes 66 thus drips down onto the plate webs 38, from where it pours onto the inner circumferential surface of the evaporator tubes 12. In order to prevent the liquid dripping down from the tank bottom 54 from splashing onto the condensation tubes 18, downward-projecting splash guard rings 68, which—as indicated by fragments in FIG. 2—lie inside the circles of the flow-through holes 66, are mounted on the underside of the tank bottom 54. Even if the distributor tank 16 overflows, the splash guard rings 68 are an effective defense against unintended splashes onto the condensation tubes 18.

Below, a variant of the downflow evaporator explained above is described. Components having the same effect are denoted by the reference numerals from FIGS. 1 and 2 and are provided with the letter a for distinguishing. In order to explain the design and the mode of action, reference is made to the preceding description.

Figure 3:
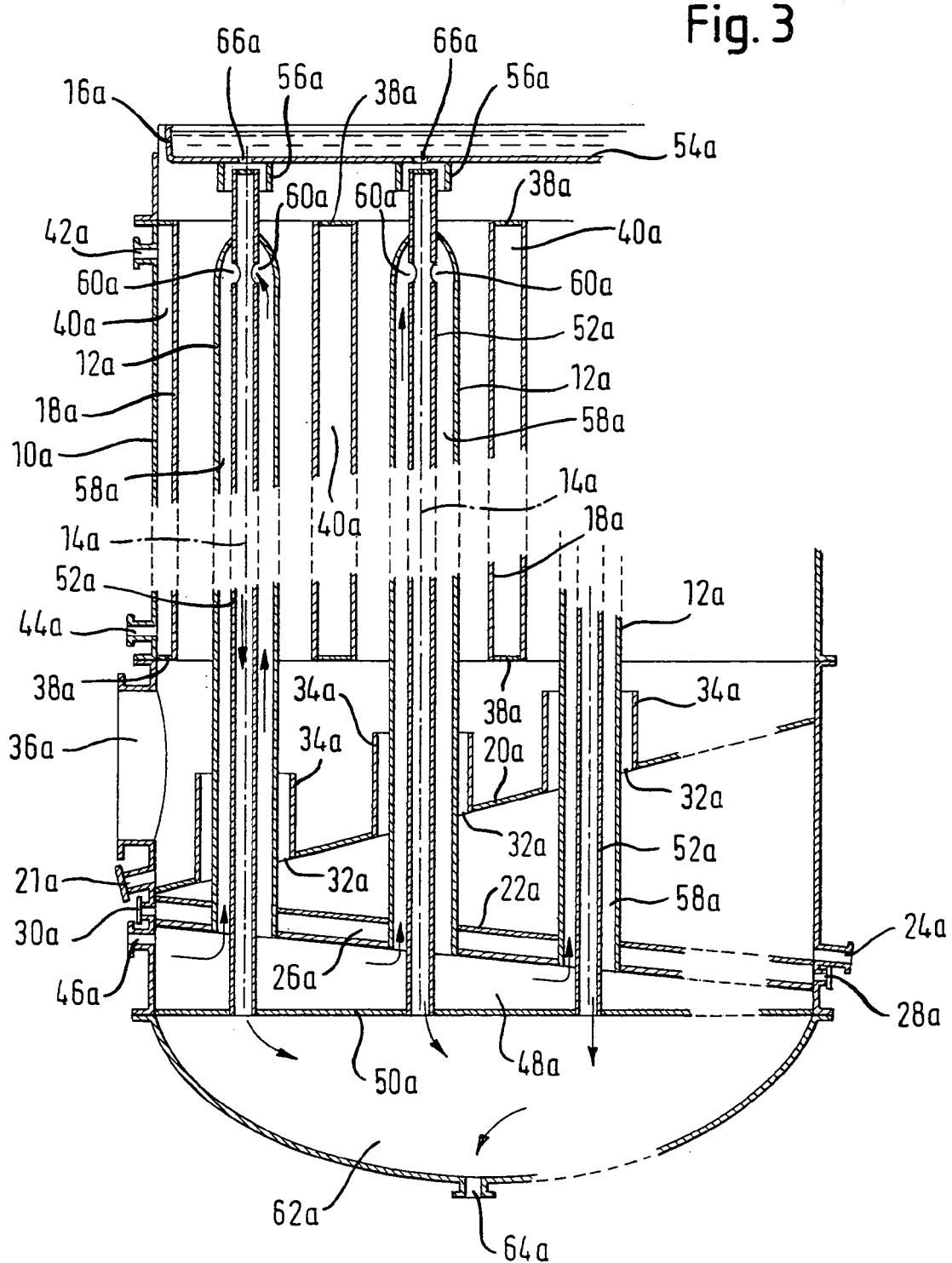
FIG. 3 shows a vertical section of a second embodiment of a downflow evaporator according to the invention.

The downflow evaporator shown in FIG. 3 differs from the downflow evaporator of FIGS. 1 and 2 primarily in that the evaporator tubes 12a are now arranged coaxially in the coordinated condensation tubes 18a. Accordingly, the receiving plate 20a receiving the condensed distillate and the receiving plate 22a receiving the concentrate are also interchanged in their arrangement one above the other. The receiving plate 20a is arranged at the top and the receiving plate 22a underneath.

As shown in detail in FIG. 3, each of the evaporator tubes 12a is heated on the inside and is connected to a heating medium circulation in which a heating medium, for example superheated steam, circulates. The heating medium flows via an inlet connection 46a of the casing 10a into a heating medium distributor space 48a, which is bounded at the top by the intermediate plate 22a and at the bottom by an intermediate wall 50a. Each evaporator tube 12a is double-walled and contains an inner tube 52a opening in the intermediate wall 50a. The heating medium flows through the intermediate space 58a between the tubes 12a, 52a and, in the region of the upper end of the evaporator tube 12a, enters openings 60a in the inner tube 52a, where it emerges in a downward direction into a collecting space 62a and is removed via an outlet 64a.

The condensation tube 18a is likewise double-walled and contains a cavity 40a which surrounds the condensation tube 18a and can be connected to the coolant circulation via connecting pieces 42a, 44a.

The receiving plates 20a, 22a are once again installed inclined in opposite directions in the casing 10a, the evaporator tubes starting from the lower receiving plate 22a passing through the upper receiving plate 20a at a distance in openings 32a, while the condensation tubes 18a end above the receiving plate 20a. Of course, the receiving plates 20a, 22a can also be installed so that they are inclined in the same direction.

At their upper ends, the evaporator tubes 12a are led to the distributor tank 16a arranged above the evaporator tubes 12a. The distributor tank 16a has, as shown in the case of 66a, holes via which the substance to be evaporated can emerge onto the top of the evaporator tubes 12a. The evaporator tubes 12a are led to retaining rings 56a on the underside of the tank bottom 54a, the retaining ring 56a surrounding the inner tube 52a at a radial distance and at the same time forming a splash guard ring.

The substance to be evaporated emerges via the holes 66a and runs down the outer surface of the evaporator tube 12a through the openings 32a to the receiving tray 22a, along which the unevaporated concentrate is removed via the connecting piece 24a. The substance evaporated in the overlap region with the condensation tube 18a condenses on the inner surface of the condensation tube 18a and runs as condensed distillate to the receiving plate 20a, where it is removed via the connecting pieces 21a. In order to prevent the distillate from passing through the openings 32a, these are raised by means of dividing tubes 34a below the condensation tubes 21a.

Similarly to the embodiment of FIGS. 1 and 2, the receiving plate 22a which removes the concentrate is double-walled and bounds a cavity 26a which can be fed with a heating medium via the connecting pieces 28a, 30a.

The evacuating connection 36a, via which gases and the uncondensable components of the vapor are removed from the working space between the evaporator tubes 12a and the condensation tubes 18a, is provided, in the embodiment of FIG. 3, for reducing pressure drops above the upper receiving plate, but below the overlap region of the pairs 12a, 18a of tubes. Of course, the evacuating connection can be provided at this point also in the embodiment of FIGS. 1 and 2.

In the variant of FIG. 3, too, the working space between the evaporator tube 12a and the condensation tube 18a concentrically surrounding the evaporator tube 12a and belonging to each pair of tubes contains no pressure-reducing internals and has a radial width of a few centimeters.

The invention claimed is:

1. A device for downward flow evaporation of a liquid substance and subsequent condensation of the vapor formed, comprising:
   a) a plurality of vertical evaporator tubes housed side-by-side in a common casing;
   b) a distributor tank which is arranged above the evaporator tubes and from which the substance contained therein can be fed to the evaporator tubes with production of a film of the substance which runs down the tube surface of said evaporator tubes;
   c) a heat exchanger arrangement arranged in the casing and having a plurality of vertical condensation tubes having a surface upon which the vapor can be condensed;
   d) receiving means which are housed below the evaporator tubes and below the condensation tubes in the casing and which separately receive unevaporated concentrate of the substance which runs down the tube surface of the evaporator tubes or condensed distillate of the substance which runs down the tube surface of the condensation tubes, wherein the evaporator tubes and the condensation tubes are arranged coaxially one inside the other in pairs,
   e) an obstacle-free working space defined between the evaporator surface formed by the tube surface of the evaporator tubes and the condensation surface formed by the tube surface of the condensation tubes being coaxially opposite one another and spaced apart from one another by an obstacle-free distance of about between 0.5 cm and 15.0 cm;
   f) a heating cavity for heating the evaporator tubes, the heating cavity being divided into a plurality of sub-cavities separately fed with a heating fluid so as to establish different temperatures along the evaporator tubes; and
   g) pumping means for evacuating the working space to a reduced pressure to a reduced pressure of less than 1 mbar.

2. The device as claimed in claim 1, wherein the condensation tubes are arranged coaxially in the evaporator tubes, the inner surface of the evaporator tubes forming the evaporator surface and the outer surface of the condensation tubes forming a condensation surface coaxial therewith.

3. The device as claimed in claim 2, wherein the receiving means comprise two receiving trays which are arranged one above the other and the upper one of which receives the concentrate and the lower one of which receives the distillate, and that the upper of the two receiving trays has a passage which is coordinated with each condensation tube and through which the distillate deposited on the relevant condensation tube passes onto the lower receiving tray.

4. The device as claimed in claim 3, wherein each condensation tube is led through the coordinated passage at a distance from its opening edge all around.

5. The device as claimed in claim 1, wherein the evaporator tubes are arranged coaxially in the condensation tubes, the inner surface of the condensation tubes forming the condensation surface and the outer surface of the evaporator tubes forming an evaporator surface coaxial therewith.

6. The device as claimed in claim 5, wherein the receiving means comprise two receiving trays which are arranged one above the other and the upper one of which receives the distillate and the lower one of which receives the condensate, and that the upper of the two receiving trays has a passage which is coordinated with each evaporator tube and through which the concentrate running down the relevant evaporator tube passes onto the lower receiving tray.

7. The device as claimed in claim 6, wherein each evaporator tube is led through the coordinated passage at a distance from its opening edge all around.

8. The device as claimed in claim 3, wherein each passage is bordered by an upward-projecting annular collar.

9. The device as claimed in claim 3, wherein the receiving trays are formed by substantially flat receiving plates installed obliquely relative to the horizontal in the casing.

10. The device as claimed in claim 3, wherein at least one of the receiving trays is heatable.

11. The device as claimed in claim 10, wherein the heatable receiving tray is double-walled with a cavity between its two walls, and the cavity is connected to a circulation for a heating medium.

12. The device as claimed in claim 3, wherein the casing has, between the two receiving trays or above the upper of the two receiving trays, a connection for an evacuating pipe connected to pumping means.

13. The device as claimed in claim 1, wherein each inner tube of each evaporator tube/condensation tube pair is supported on the distributor tank.

14. The device as claimed in claim 2, wherein for feeding the substance to the evaporator tubes, the distributor tank is in the form of a perforated tank whose tank bottom has, coordinated with each evaporator tube, a flow-through hole concentric therewith or an arrangement of flow-through holes distributed in a circular manner and intended for the substance contained in the distributor tank.

15. The device as claimed in claim 1, wherein splash guard surfaces which project downward over the tank bottom of the distributor tank but end above the condensation tube and serve for defense against splashes of the substance to be evaporated onto the condensation tubes are arranged on the distributor tank.

16. The device as claimed in claim 9, wherein the receiving trays are formed by substantially flat receiving plates installed obliquely in opposite directions relative to the horizontal in the casing.

17. The device as claimed in claim 10, wherein the at least one heatable receiving trays is the concentrate receiving tray.

* * * * *